(12) United States Patent
Hirota et al.

(10) Patent No.: US 8,047,063 B2
(45) Date of Patent: Nov. 1, 2011

(54) EXHAUST PURIFICATION DEVICE OF INTERNAL COMBUSTION ENGINE

(75) Inventors: Shinya Hirota, Susono (JP); Takamitsu Asanuma, Mishima (JP); Kohei Yoshida, Gotenba (JP); Hiromasa Nishioka, Susono (JP); Kotaro Hayashi, Mishima (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 470 days.

(21) Appl. No.: 12/309,764

(22) PCT Filed: May 14, 2008

(86) PCT No.: PCT/JP2008/059300
§ 371 (c)(1),
(2), (4) Date: Jan. 29, 2009

(87) PCT Pub. No.: WO2008/143273
PCT Pub. Date: Nov. 27, 2008

(65) Prior Publication Data
US 2009/0320450 A1 Dec. 31, 2009

(30) Foreign Application Priority Data
May 15, 2007 (JP) .................................. 2007-128954

(51) Int. Cl.
*G01M 15/10* (2006.01)

(52) U.S. Cl. .................................. 73/114.71; 73/114.75
(58) Field of Classification Search ............... 73/114.69, 73/114.71, 114.72, 114.73, 114.75
See application file for complete search history.

(56) References Cited

U.S. PATENT DOCUMENTS

| | | | |
|---|---|---|---|
| 7,267,991 B2* | 9/2007 | Ceccarini et al. | 436/119 |
| 2003/0134425 A1* | 7/2003 | Ceccarini et al. | 436/119 |
| 2007/0065341 A1* | 3/2007 | Asanuma | 422/62 |
| 2009/0308053 A1* | 12/2009 | Nishioka et al. | 60/276 |

FOREIGN PATENT DOCUMENTS

| | | |
|---|---|---|
| JP | A-60-198433 | 10/1985 |
| JP | A-2000-230419 | 8/2000 |
| JP | A-2002-058958 | 2/2002 |
| JP | A-2004-239706 | 8/2004 |

* cited by examiner

Primary Examiner — Eric S McCall
(74) Attorney, Agent, or Firm — Oliff & Berridge PLC

(57) ABSTRACT

In an internal combustion engine, a sulfur detection sample gas is generated in a sample gas generation chamber by fuel of an amount smaller than the amount of fuel fed to a combustion chamber and proportional to the amount of fuel fed to the combustion chamber. An SOx sensor having a sensor part trapping the sulfur contained in the sample gas and capable of detecting the amount of sulfur trapped in the sensor part from the property changes of the sensor part is provided. The amount of SOx that flows into the catalyst is estimated from the output value of this SOx sensor.

8 Claims, 6 Drawing Sheets

(A)

(B)

(C)

(A)

(B)

(C)

(D)

(A)

(B)

(A)

(B)

(C)

EXHAUST PURIFICATION DEVICE OF INTERNAL COMBUSTION ENGINE

TECHNICAL FIELD

The present invention relates to an exhaust purification device of an internal combustion engine.

BACKGROUND ART

In the past, there have been known $SO_x$ concentration sensors arranged inside engine exhaust gas passages so as to detect the $SO_x$ concentration in the exhaust gas. These known $SO_x$ concentration sensors normally use solid electrolytes and measure the electromotive force generated by the change of $SO_x$ into sulfate ion to detect the $SO_x$ concentration in the exhaust gas (for example, see Japanese Patent Publication (A) No. 2004-239706).

However, a conventional $SO_x$ detection system using this kind of $SO_x$ concentration sensor can only operate under high temperatures and becomes bulky as an apparatus. In particular, when the $SO_x$ concentration is low, there is the large problem of not being able to detect the $SO_x$ concentration. Conventionally, as in this $SO_x$ concentration sensor, attention has only been directed at instantaneously and directly detecting the $SO_x$ concentration in the exhaust gas. So long as trying to instantaneously and directly detect the $SO_x$ concentration in the exhaust gas in such a way, various problems inevitably occur like as explained above.

Therefore, the inventors changed their way of thinking and focused not on instantaneously detecting the $SO_x$ concentration, but on detecting the cumulative amount of sulfur S over a long period. It has been proven that by changing the way of thinking in this way, it would be possible to easily estimate the amount of $SO_x$ in the exhaust gas even without directly detecting the $SO_x$ concentration in the exhaust gas.

DISCLOSURE OF THE INVENTION

An object of the present invention is to provide an exhaust purification device of an internal combustion engine capable of easily detecting the amount of $SO_x$ flowing into a catalyst.

According to the present invention, there is provided an exhaust purification device of an internal combustion engine arranging an exhaust gas purification catalyst inside an engine exhaust gas passage, wherein a sample gas for sulfur detection is generated from fuel of a smaller amount than an amount of fuel fed to a combustion chamber and proportional to the amount of fuel fed to the combustion chamber, an $SO_x$ sensor having a sensor part trapping a sulfur contained inside the sample gas and capable of detecting an amount of sulfur trapped at the sensor part from changes in property of the sensor part is provided, and an amount of $SO_x$ flowing into the catalyst is detected from an output value of the $SO_x$ sensor.

BEST MODE FOR CARRYING OUT THE INVENTION

Figure 1:
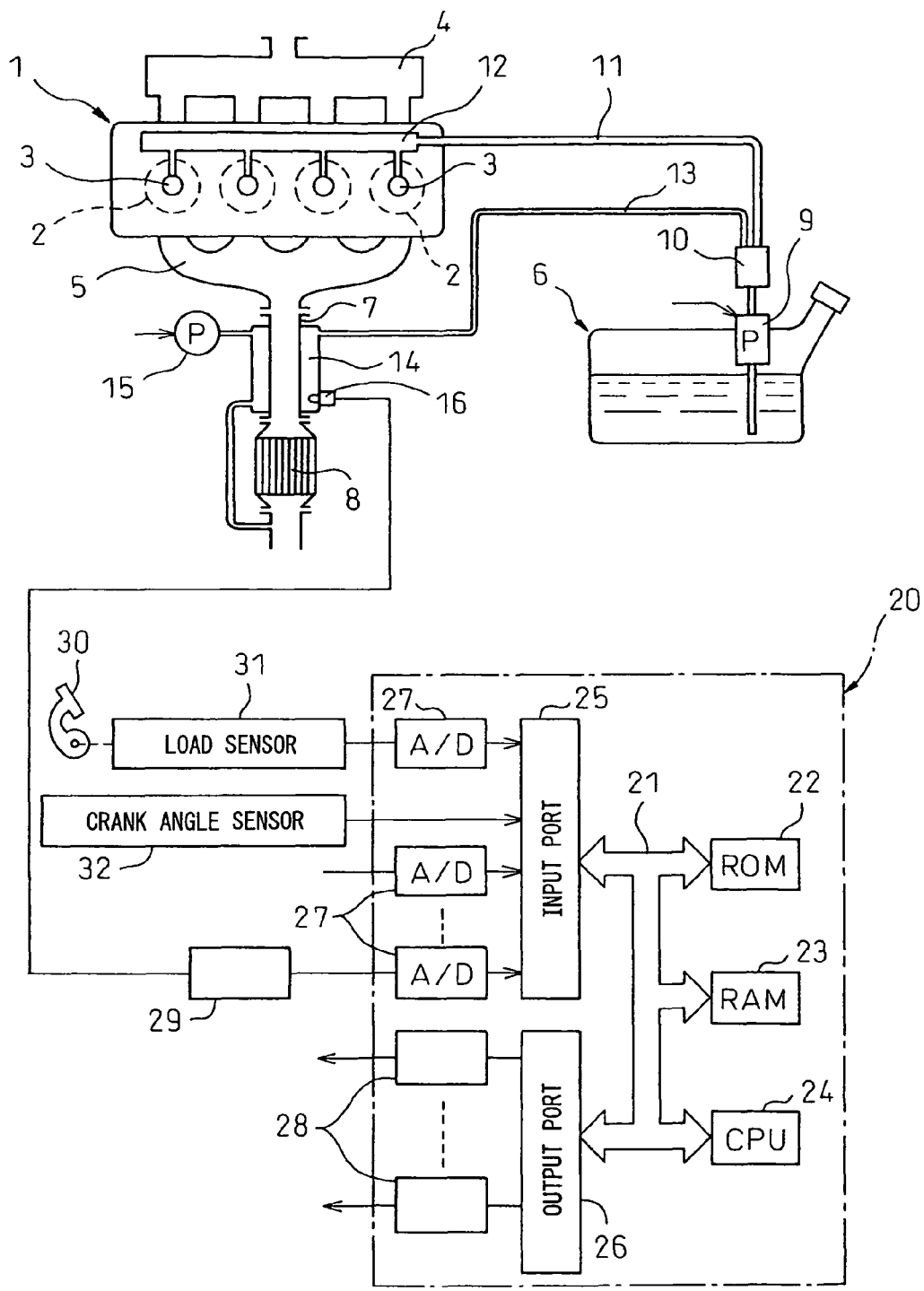
FIG. 1 is a view showing a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronic control type fuel injector for injecting fuel into each combustion chamber 2, 4 an intake manifold, 5 an exhaust manifold, and 6 a fuel tank. The exhaust manifold 5 is connected through an exhaust pipe 7 to an exhaust purification catalyst 8. In the embodiment shown in FIG. 1, this catalyst 8 comprises an $SO_x$ trap catalyst for trapping the $SO_x$ contained inside the exhaust gas in order to prevent the $SO_x$ from flowing into a catalyst arranged downstream of the catalyst 8.

The fuel tank 6 has a fuel feed pump 9 attached to it. The fuel discharged from the fuel feed pump 9 is divided at a fuel divider 10 into injection fuel and sample fuel. The injection fuel is fed through a fuel feed pipe 11 to a common rail 12 for distributing fuel to the fuel injectors 3, while the sample fuel is fed through a fuel feed pipe 13 to a sample gas generation chamber 14 formed around the exhaust pipe 7. The sample fuel fed into this sample gas generation chamber 14 is a much smaller amount than the amount of injection fuel fed to the combustion chamber 2 and proportional to the amount of injection fuel fed to the combustion chamber 2.

As shown in FIG. 1, an air pump 15 is provided for supplying air into the sample gas generation chamber 14. The fuel fed from the fuel feed pipe 13 and air supplied from the air pump 15 generate sulfur detection sample gas inside the sample gas generation chamber 14. Further, inside the sample gas generation chamber 1, an $SO_x$ sensor 16 is arranged for detecting sulfur in the sample gas.

An electronic control unit 20 is comprised of a digital computer provided with a ROM (read only memory) 22, RAM (random access memory) 23, CPU (microprocessor) 24, input port 25, and output port 26 all connected to each other by a bidirectional bus 21. The output of the $SO_x$ sensor 16 is calibrated at a detection circuit 29, while the calibrated output is input through a corresponding AD converter 27 to the input port 25. Further, an accelerator pedal 30 is connected to a load sensor 31 generating an output voltage proportional to the depression amount L of the accelerator pedal 30. The output voltage of the load sensor 31 is input through a corresponding AD converter 27 to the input port 25. Further, the input port 25 has a crank angle sensor 32 generating an output pulse every time the crank shaft rotates by for example 15° connected to it. On the other hand, the output port 26 are connected to the fuel injectors 3, fuel feed pump 9, and air pump 15 through corresponding drive circuits 28.

Figure 2:
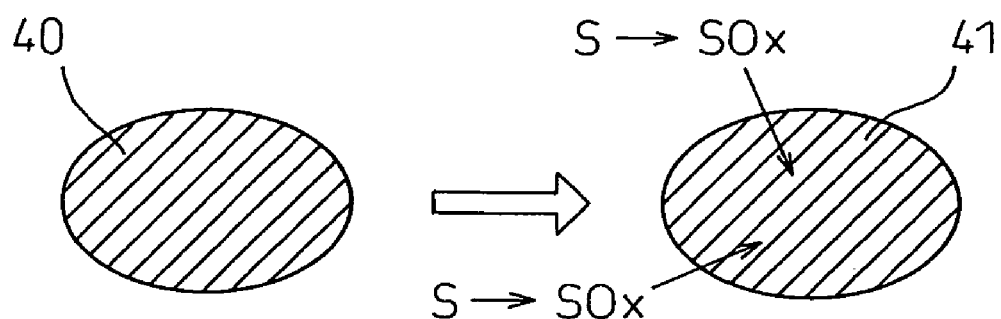
FIG. 2 is a view explaining the principle of detection of sulfur.
Figure 2:
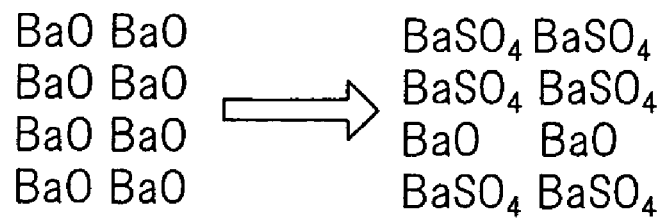
Figure 2:
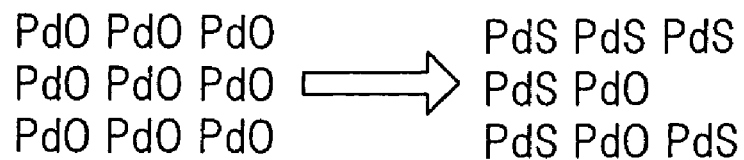

FIG. 2 shows the principle of detection of the sulfur component of the SOX sensor 16. The sensor part of the $SO_x$ sensor 16 is formed from a metal or metal compound able to trap the sulfur component in the sample gas. FIG. 2(A) schematically shows the metal or metal compound forming the sensor part of the $SO_x$ sensor 16 by the reference numeral 40. The metal or metal compound 40 shown in FIG. 2(A) is comprised of a non-sulfur containing metal or metal compound. In an embodiment of the present invention, this metal or metal compound 40 comprises an alkali metal, alkali earth metal, rare earth metal, precious metal, or metal compound of the same.

Next, the method of detection of the sulfur component will be explained for the case where barium Ba which is one of an alkali earth metal, or a compound of the same is used as the metal or metal compound 40.

Barium Ba becomes barium oxide BaO in the atmosphere. This barium oxide BaO, when placed in the exhaust gas, immediately changes to barium carbonate $BaCO_3$ due to the CO and $CO_2$ contained in the exhaust gas. Further, this barium carbonate $BaCO_3$ changes to barium nitrate $Ba(NO_3)_2$ due to the $NO_x$ in the exhaust gas.

That is, when barium Ba is used, the metal or metal compound 40 shown in FIG. 2(A) is barium oxide BaO, barium carbonate $BaCO_3$, or barium nitrate $Ba(NO_3)_2$. When this metal or metal compound 40 is placed in the exhaust gas, it becomes barium nitrate $Ba(NO_3)_2$. In an embodiment of the present invention, the metal or metal compound 40 shown in FIG. 2(A) comprises barium oxide BaO.

On the other hand, the fuel contains sulfur. Accordingly, the sample gas contains sulfur. This sulfur S is trapped in the metal or metal compound 40 and changes to a sulfur-containing metal compound 41 shown in FIG. 2(A). When barium Ba is used, this sulfur-containing metal compound 41 is barium sulfate $BaSO_4$. Accordingly, when the metal or metal compound 40 is placed in the sample gas, as shown in FIG. 2(B), the barium oxide BaO of part of the metal compound 40 comprising barium oxide changes to barium sulfate $BaSO_4$. Expressed generally, a portion of the oxide changes to a sulfate. In this case, the ratio of sulfate in the metal compound 41 becomes higher along with the passage of time, that is, the more the amount of trapped sulfur component increases.

Note that if the air-fuel ratio of the sample gas is lean, that is, the sample gas contains a sufficient amount of oxygen, and the temperature of the sample gas is higher than 300° C. or so, the sulfur in the sample gas becomes easier to trap in the form of $SO_x$ in the metal or metal compound 40, that is, in the sensor part of the $SO_x$ sensor 16. Accordingly, in the embodiment shown in FIG. 1, the air pump 15 is controlled so that the sample gas becomes a lean air-fuel ratio, and the sample gas generation chamber 14 is formed around the exhaust pipe 7 so as to raise the temperature of the sample gas so that the temperature of the sensor part of the $SO_x$ sensor 16 is placed at a temperature where sulfur becomes easy to trap in the form of $SO_x$. Of course, an electric heater and other temperature raising means may be used for raising the temperature of the sample gas.

On the other hand, FIG. 2(C) shows the case where the metal or metal compound 40 comprises a precious metal or other compound. Palladium Pd, rhodium Rh, or platinum Pt may be used as this precious metal. FIG. 2(C) shows a case where palladium Pd is used as an example. In this case, if sulfur is trapped, the metal oxide PdO changes to the sulfide PdS.

If the oxide changes to sulfate or if the metal oxide changes to a sulfide, its properties change. Accordingly, the amount of sulfur trapped can be detected from the change in these properties. On the other hand, as mentioned above, the amount of fuel fed in the sample gas generation chamber 14 is proportional to the amount of fuel injection fed into the combustion chamber 2. Accordingly, if the amount of sulfur in the sample gas is known, the amount of sulfur in the exhaust gas, that is, the amount of $SO_x$ flowing into the catalyst 8, can be determined.

Therefore, in the present invention, an $SO_x$ sensor 16 having a sensor part trapping the sulfur contained in the sample gas and capable of detecting the amount of sulfur trapped in the sensor part from a change in property of the sensor part is provided and the amount of $SO_x$ flowing into the catalyst 8 is detected from the output value of the $SO_x$ sensor 16.

Next, referring to FIG. 3 to FIG. 6, representative examples of the properties to be measured and the methods of detection corresponding to the properties to be measured will be explained. Note that FIG. 3 to FIG. 6 will be explained taking as an example the case of an oxide changing to a sulfate as shown in FIG. 2(B).

Figure 3:
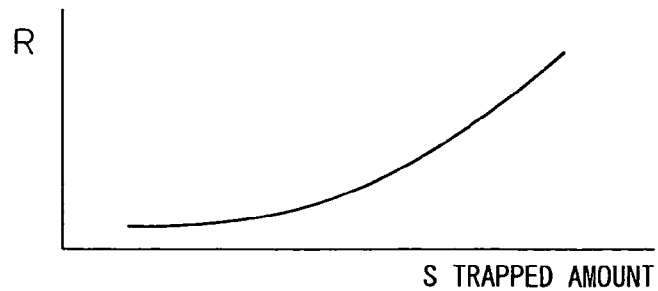
FIG. 3 is a view explaining the method of detection of sulfur.
Figure 3:
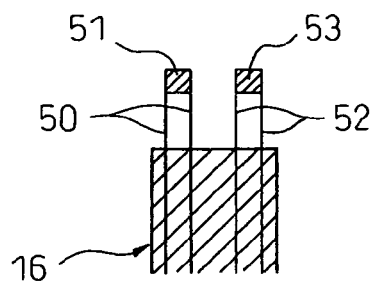
Figure 3:
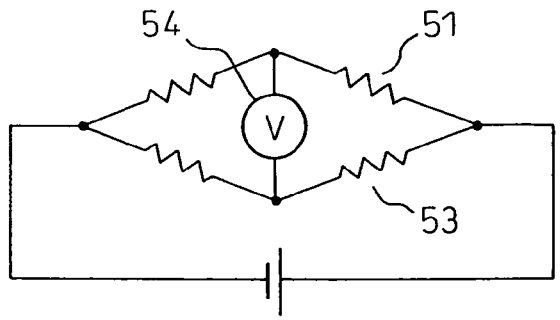
Figure 3:
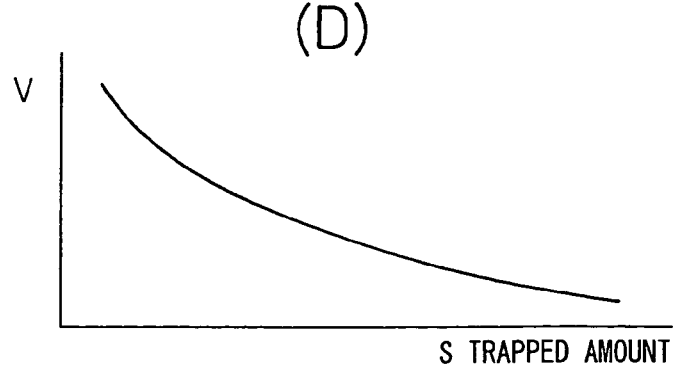

FIG. 3 shows a case where the property to be measured is an electrical property and shows a case where the measured electrical property is the electric resistance.

FIG. 3(A) shows the relationship of the amount of trapped sulfur S and the electric resistance R. As shown in FIG. 3(A), the more the amount of trapped sulfur S increases, that is, the greater the amount of change of oxides to sulfates, the greater the increase in the electric resistance R. Accordingly, the amount of trapped sulfur S, that is, the cumulative value of the amount of $SO_x$ flowing into the catalyst 8, can be determined from the electric resistance R.

FIG. 3(B) shows the detection part of the $SO_x$ sensor 16 shown in FIG. 1. As shown in FIG. 3(B), the detection part of the $SO_x$ sensor 16 arranged inside the sample gas generation chamber 14 is comprised of a sensor part for detection 51 comprised of a metal compound piece supported by a pair of terminals 50 and a sensor part for reference 53 comprising a metal compound piece supported by a pair of terminals 52. The sensor part for detection 51 is formed from an oxide, while the sensor part for reference 53 is formed from a sulfate. If the sample gas circulates, the sensor part for reference 53 does not change, but in the sensor part for detection 51, the oxide changes gradually to sulfate. Therefore, the electric resistance R of the sensor part for detection 51 will gradually increase.

The electric resistance R of the sensor part for detection 51 becomes higher if the ambient temperature becomes higher. Accordingly, the sensor part for reference 53 is provided to remove the effect that this kind of temperature change has on the electric resistance. For example, a detection circuit 29 (FIG. 1) comprised of a Wheatstone bridge such as shown in FIG. 3(C) is used to find the trapped amount of sulfur S from the difference between the electric resistance of the sensor part for detection 51 and the electric resistance of the sensor part for reference 53. When using a Wheatstone bridge as shown in FIG. 3(C), the voltage V appearing at a voltmeter 54, as shown in FIG. 3(D), falls as the trapped amount of sulfur S increases. This voltage V is input through the AD converter 27 to the input port 25.

Figure 4:
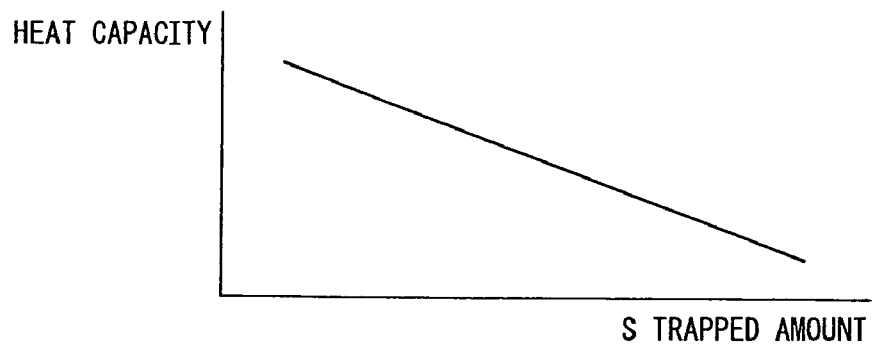
FIG. 4 is a view explaining the method of detection of sulfur.
Figure 4:
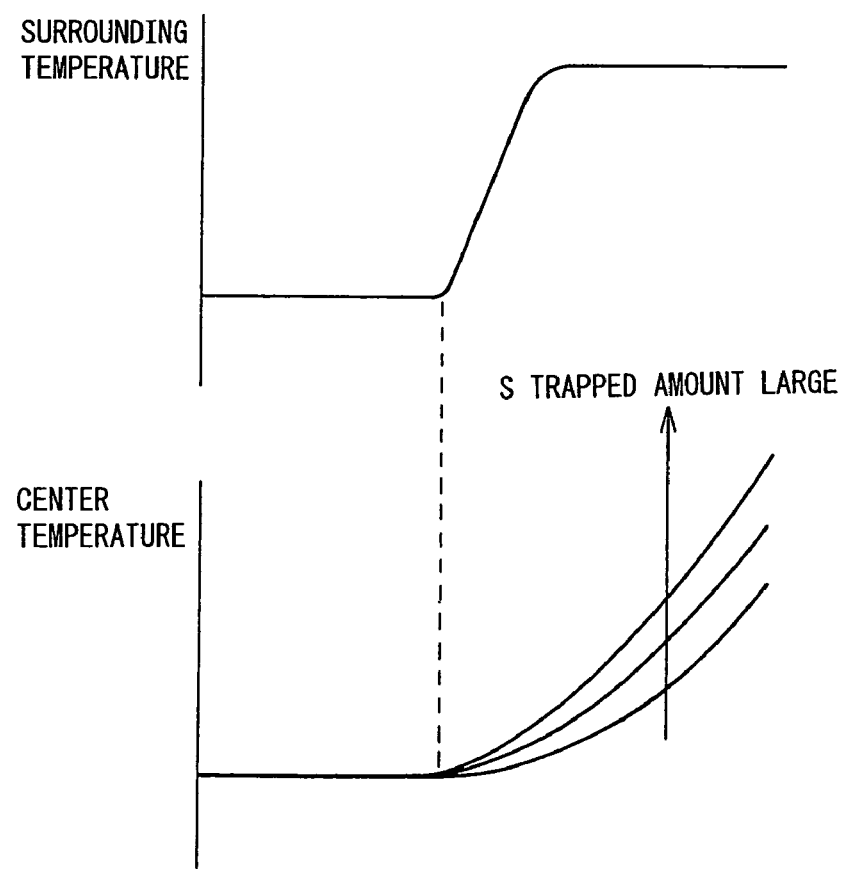
Figure 5:
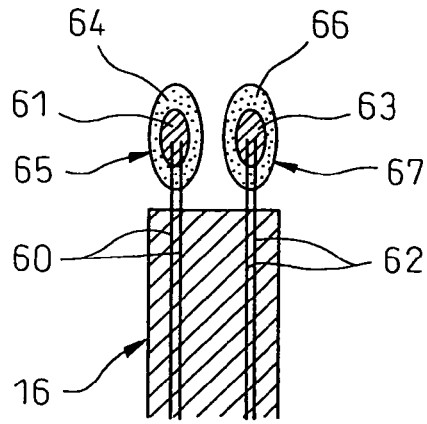
FIG. 5 is a view explaining the method of detection of sulfur.
Figure 5:
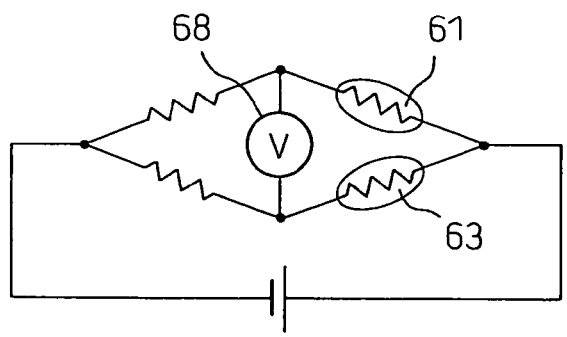
Figure 5:
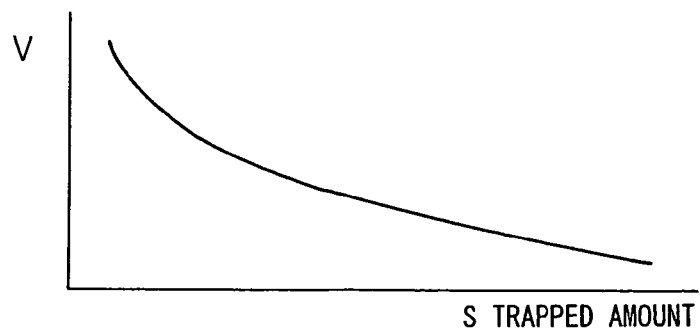
Figure 6:
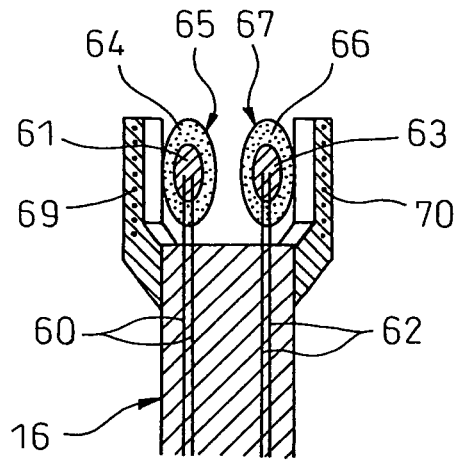
FIG. 6 is a cross-sectional view of the side surface around the sensor part of an $SO_x$ sensor showing another embodiment.

FIG. 4 to FIG. 6 show cases where the measured property is a thermal property and where the measured thermal property is the heat capacity and thermal conductivity.

As shown in FIG. 4(A), the more the trapped amount of sulfur S increases, the more the heat capacity of the sensor part comprised of the metal compound piece decreases. Accordingly, as shown in FIG. 4(B), when the temperature around the sensor part rises, the rate of increase of the center temperature of the sensor rises the more the amount of trapped sulfur S increases.

FIG. 5(A) shows the detection part of the $SO_x$ sensor 16. In the example shown in FIG. 5(A), a thermistor element 61 having a pair of lead wires 60 and a thermistor element 63 having a pair of lead wires 62 are arranged. Further, in this example, the surroundings of the thermistor element 61 are surrounded by a metal compound 64 to form a sensor part for detection 65, and the surroundings of the thermistor element 63 are surrounded by a metal compound 66 to form a sensor part for reference 67.

In this example, the heat capacity of the metal compound 64 is estimated from the response of the change in the resistance of the thermistor element 61 when the temperature around the sensor part for detection 65 changes, the heat capacity of the metal compound 63 is estimated from the response of the change in the resistance of the sensor part for reference 67 when the temperature around the thermistor element 63 changes, and the trapped amount of sulfur S is found from the difference of these heat capacities.

That is, specifically, a Wheatstone bridge such as shown in FIG. 5(B) is used to find the difference between the resistance of the thermistor element 61 and the resistance of the thermistor element 63 in the form of voltage. In this case, the voltage V of the voltmeter 68 showing the difference of resistance values falls, as shown in FIG. 5(C), the more the trapped sulfur S increases in the sensor part for detection 65.

In the example shown in FIG. 6, heaters 69 and 70 are provided for respectively heating the sensor part for detection 65 and the sensor part for reference 67. In this example, even when the ambient temperature does not change, by operating the heaters 69 and 70, it is possible to find the difference between the heat capacities of the metal compound 64 and the metal compound 66.

Further, if making the sensor part for detection 65 a high temperature, the trapped $SO_x$ is released from the metal compound 64 and the sensor part for detection 65 is regenerated. Accordingly, in this example, by operating the heater 69, the temperature of the sensor part for detection 65 rises, thereby allowing the regeneration of the sensor part for detection 65. Note that, in this case, even if the air-fuel ratio of the sample gas becomes temporarily rich, the sensor part for detection 65 can be regenerated.

Figure 7:
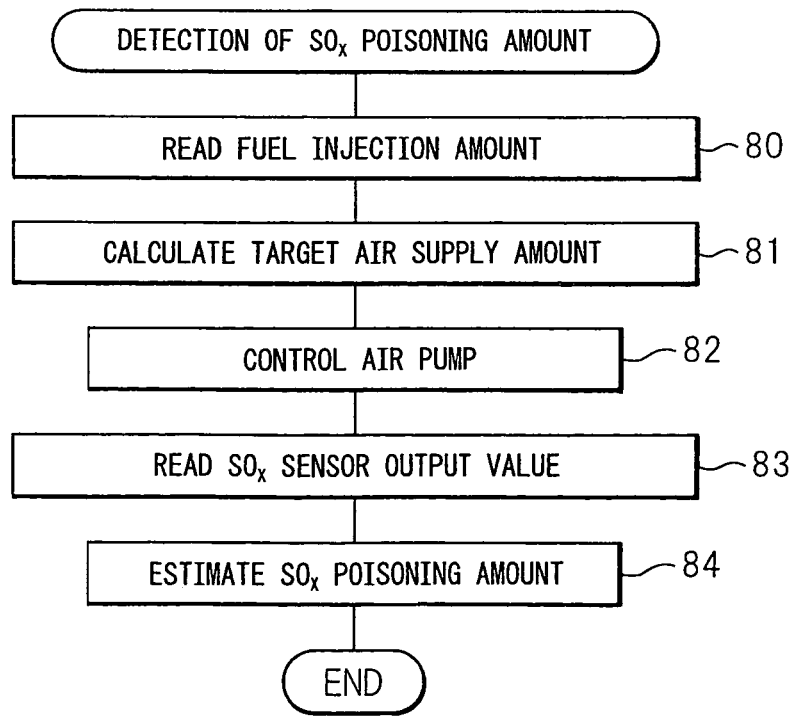
FIG. 7 is a flow chart for detecting an amount of $SO_x$ poisoning.

In the embodiment shown in FIG. 1, the $SO_x$ flowing into the $SO_x$ trap catalyst 8 is trapped in the $SO_x$ trap catalyst 8. Accordingly, the amount of $SO_x$ poisoning of the $SO_x$ trap catalyst 8 can be estimated from the output value of the $SO_x$ sensor 16. FIG. 7 shows the routine for detecting the $SO_x$ poisoning amount of the $SO_x$ trap catalyst 8.

Referring to FIG. 7, first, at step 80, the fuel injection amount calculated according to the operating state of the engine is read. The amount of fuel fed to the sample gas generation chamber 14 is found from this fuel injection amount. Next, at step 81, the necessary target air supply amount for making the air-fuel ratio of the sample gas the target lean air-fuel ratio is calculated. Next, at step 82, the air pump 15 is controlled so that the amount of air fed into the sample gas generation chamber 14 becomes this target air supply amount. Next, at step 83, an output of the $SO_x$ sensor 16 shown as V in FIG. 3(D) for example is read. At step 84, the $SO_x$ poisoning amount of the $SO_x$ trap catalyst 8 is estimated from this output value V.

LIST OF REFERENCE NUMERALS

| | |
|---|---|
| 2 | combustion chamber |
| 3 | fuel injector |
| 5 | exhaust manifold |
| 7 | exhaust pipe |
| 8 | catalyst |
| 9 | fuel feed pump |
| 11, 13 | fuel feed pipe |
| 14 | sample gas generation chamber |
| 15 | air pump |
| 16 | $SO_x$ sensor |

The invention claimed is:

1. An exhaust purification device of an internal combustion engine arranging an exhaust gas purification catalyst inside an engine exhaust gas passage, wherein a sample gas for sulfur detection is generated from fuel of a smaller amount than an amount of fuel fed to a combustion chamber and proportional to the amount of fuel fed to the combustion chamber, an $SO_x$ sensor having a sensor part trapping a sulfur contained inside the sample gas and capable of detecting an amount of sulfur trapped at the sensor part from changes in property of the sensor part is provided, and an amount of $SO_x$ flowing into the catalyst is estimated from an output value of the $SO_x$ sensor.

2. An exhaust purification device of an internal combustion engine as claimed in claim 1, wherein said sample gas is maintained at a lean air-fuel ratio.

3. An exhaust purification device of an internal combustion engine as claimed in claim 1, wherein a temperature of the sample gas is raised in order to make a temperature of said sensor part a temperature where sulfur is easily trapped in the form of $SO_x$.

4. An exhaust purification device of an internal combustion engine as claimed in claim 1, wherein said sensor part comprises a metal compound changing to a sulfate when trapping sulfur.

5. An exhaust purification device of an internal combustion engine as claimed in claim 4, wherein said metal compound comprises a compound of an alkali metal, alkali earth metal, rare earth metal, or precious metal.

6. An exhaust purification device of an internal combustion engine as claimed in claim 1, wherein properties of said sensor part changed by the amount of trapped sulfur are electrical properties represented by electric resistance or thermal properties represented by heat capacity and thermal conduction.

7. An exhaust purification device of an internal combustion engine as claimed in claim 1, wherein said sensor part comprises a sensor part for detection that changes to a sulfate when trapping sulfur and a sensor part for reference that was originally made a sulfate.

8. An exhaust purification device of an internal combustion engine as claimed in claim 1, wherein an $SO_x$ poisoning amount of said catalyst is estimated from an output value of said $SO_x$ sensor.

* * * * *